United States Patent [19]
Biehl et al.

[11] 4,336,532
[45] Jun. 22, 1982

[54] INTEGRATED NUCLEAR RADIATION DETECTOR AND MONITOR

[75] Inventors: Brian L. Biehl, Adelphi; Stuart I. Lieberman, Silver Spring, both of Md.

[73] Assignee: Radiation Engineering Inc., Beltsville, Md.

[21] Appl. No.: 152,273

[22] Filed: May 22, 1980

[51] Int. Cl.³ .................... G01T 1/16; G08B 21/00
[52] U.S. Cl. .................... 340/600; 250/388; 250/389; 324/459; 340/661
[58] Field of Search ............... 340/600, 661, 514, 515; 250/375, 376, 378, 388, 389, 392, 394; 324/459

[56] References Cited
U.S. PATENT DOCUMENTS

| | | | |
|---|---|---|---|
| 2,496,886 | 2/1950 | Molloy et al. | 340/600 X |
| 2,617,946 | 11/1952 | Weller | 250/375 |
| 2,716,523 | 8/1955 | Driver | 250/375 X |
| 2,968,726 | 1/1961 | Bersin et al. | 250/388 |
| 3,038,997 | 6/1962 | Manning et al. | 340/600 X |
| 3,364,353 | 1/1968 | Roulet | 340/600 X |
| 3,878,496 | 4/1975 | Erickson | 250/388 X |
| 3,987,319 | 10/1976 | Nirschl | 340/600 X |
| 4,020,479 | 4/1977 | Conforti et al. | 340/661 X |

Primary Examiner—John W. Caldwell, Sr.
Assistant Examiner—Joseph E. Nowicki
Attorney, Agent, or Firm—Lawrence I. Field

[57] ABSTRACT

A battery powered device which can continuously monitor and detect nuclear radiation utilizing fully integrated circuitry and which is provided with an alarm which alerts persons when the radiation level exceeds a predetermined threshold.

7 Claims, 4 Drawing Figures

INTEGRATED NUCLEAR RADIATION DETECTOR AND MONITOR

This invention relates to a radiation detector and monitor utilizing fully integrated circuitry.

One object of the invention is to provide an inexpensive, simple, trouble-free battery powered device which can continuously monitor and detect nuclear radiation and which is provided with an alarm whereby persons in the vicinity of the presence of such radiation can be warned.

A further object of the invention is to provide a radiation monitor which can be utilized to measure levels of radiation varying from amounts above the normal background present in the usual environment up to very much higher levels as might result from a spill of nuclear material in a laboratory or nuclear power plant.

A further object of the invention is to provide a single button for testing the proper operation of the device and to provide a reset function for measurement of radiation levels.

These and other objects will become apparent from the description which follows taken with the drawings in which.

Figure 1:
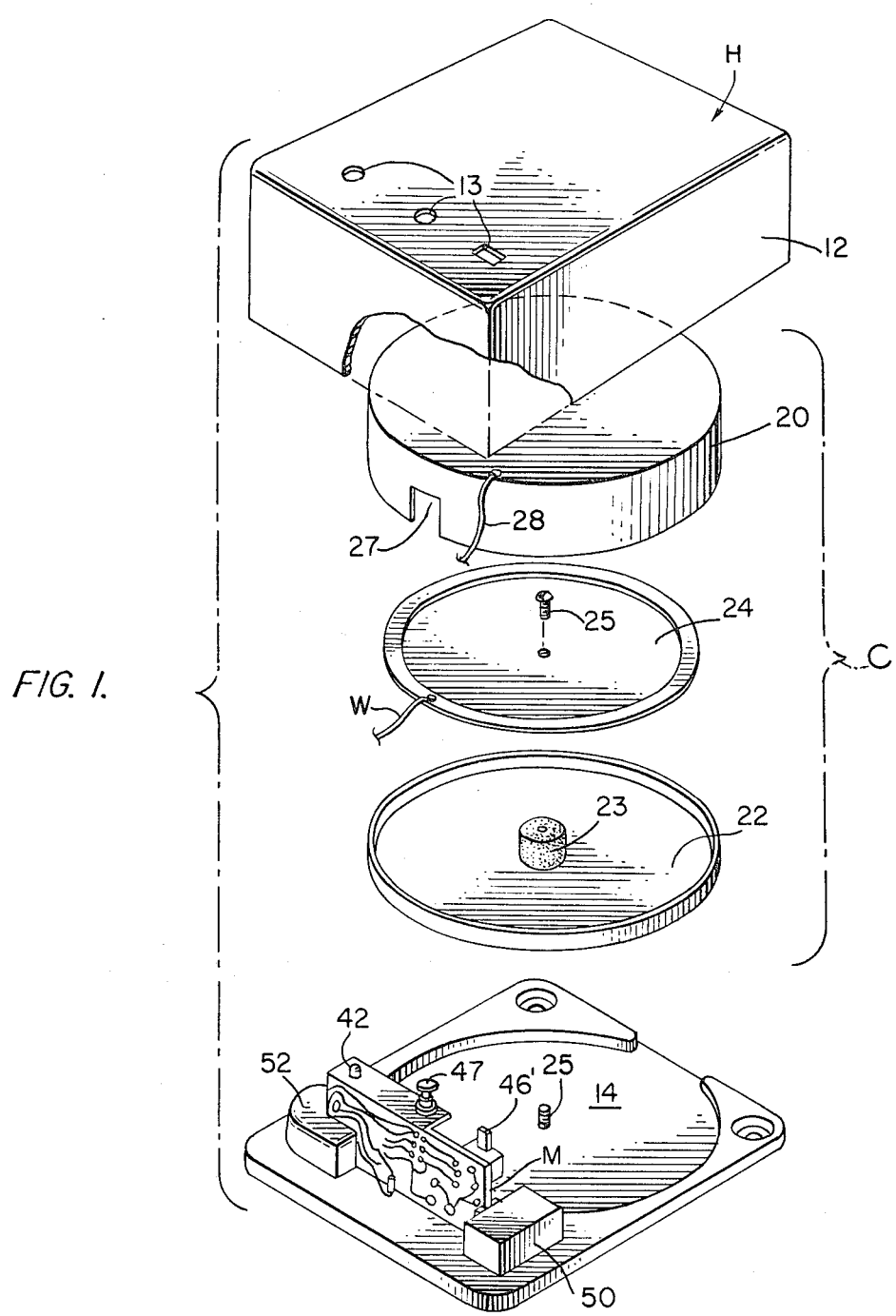
FIG. 1 is an exploded perspective view of one embodiment of this invention.

As shown in FIG. 1, the radiation detector and monitor comprises a housing H which is transparent to the radiation to be detected, e.g., gamma rays, and which is provided in order to protect the circuit components from contamination by dust, rain and the like, which might adversely affect their operability. Housing H includes a cover 12 which encloses the components and circuitry and a base 14 on which they are supported.

The top housing H is provided with apertures 13 through which a light 42 and actuating button 46' and 47 extend. Button 47 actuates the test and reset switches 34 and 36 and 46' actuates switch 46 connected to the audible alarm 44 see FIG. 2.

The detector comprises an ionization chamber C which includes a cover 20 and a bottom 22 which together define the ionization chamber C. Within chamber C and electrically insulated from the chamber, there is an electrically conductive electrode 24 which is sensitive to the radiation to be monitored. Electrode 24 is supported on a piece of high quality (low leakage) plastic 23 which insulates it from bottom 22. Electrode 24 is secured to base 14 and bottom 22 which is supported on base 14 by means of screws 25. The chamber C and electrode 24 are normally maintained so that a definite potential exists between the two. A slot 27 in cover 20 allows a wire W to make an electrical connection from the electrode 24 to comparator 38 located on a printed circuit board M outside the chamber. Base 14 is formed with a well 50 which is open on the underside of base 14 so as to receive a battery 33, and with another well 52 adapted to house an alarm 44. Also supported on base 14 is a printed circuit board M containing the circuitry shown in FIG. 2.

Figure 2:
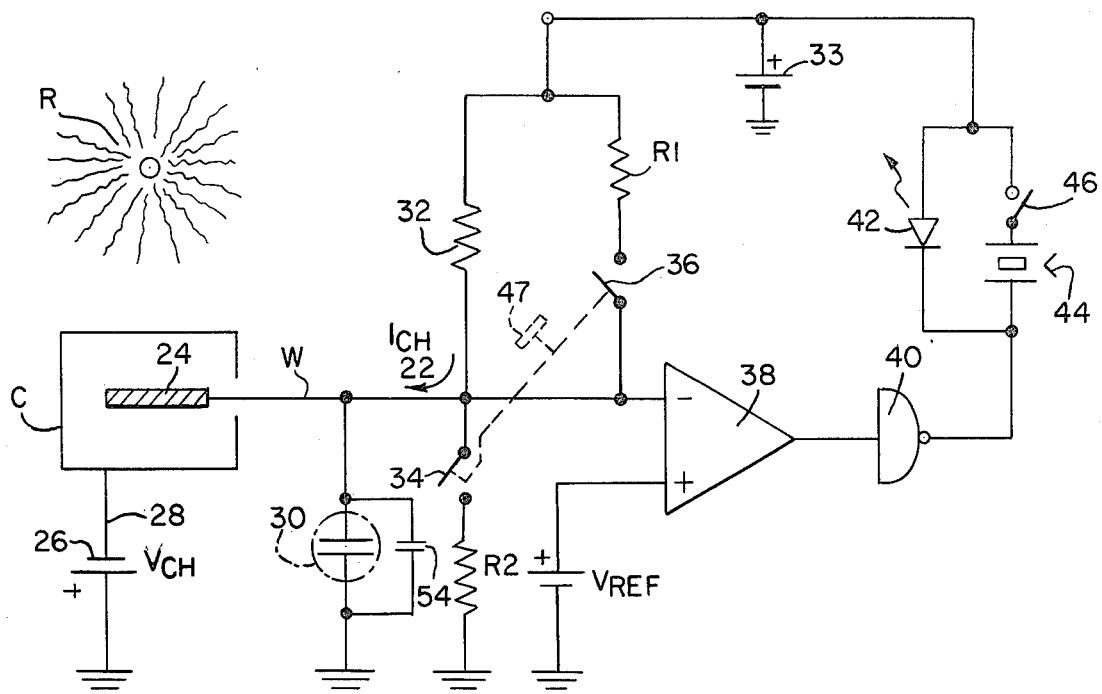
FIG. 2 is a diagrammatic schematic of one integrated circuit utilized in the device of FIG. 1.

Positive electrode 24 is electrically connected by wire W to each of the following by the integrated circuitry shown in FIG. 2:

(a) the equivalent chamber capacitance comprised of the chamber capacitance 30 plus an optional external capacitor 54;

(b) a very high resistance resistor 32, e.g., 1 terraohm;

(c) a test switch 34 and resistor $R_2$;

(d) a reset switch 36 and resistor $R_1$; and (e) a low leakage comparator 38.

A nine (9) volt dry cell battery 33 or other source of potential is connected to resistor 32, resistor $R_1$ and reset switch 36 and is the means whereby the monitor is continuously powered. Because of the very small amounts of current which are required to operate the monitor, the device may be operated for at least one year before replacement for battery 33 is required.

An invertor 40 connects comparator 38 to an audible alarm 44 and to a flashing light 42 which indicates that the device is operational by flashing intermittently. These are also powered to battery 33. A switch 46 is provided to cut off the audible alarm 44 if an audible signal is not desired.

As best seen in FIG. 2, chamber C is electrically connected by wire W to point 26 which is maintained at a potential $V_{ch}$ (which may be zero) whereby the walls of the chamber C are maintained at such a potential that the current $I_{CH}$ flowing from electrode 24 to the walls of the chamber is equal to the saturation current of the ionization chamber C. This current produces a voltage drop across a very high resistance resistor 32 connected to electrode 24.

$V_{ref}$ represents a potential generated by a potentiometer which is connected to a source of potential such as battery 33 and is applied to the positive terminal of comparator 38.

When a nuclear radiation source R emits radiation in the vicinity of the monitor, gamma rays penetrate the chamber C causing a small current $I_{CH}$ to flow between the positive electrode 24 and the chamber walls. The potential of the chamber walls $V_{ch}$ is such that the current flow is equal to the saturation current of the ionization chamber for all levels of radiation to be measured, to insure that a linear relationship between the radiation level and time is obtained. If a nonlinear relationship between the radiation level and time is desired, this potential $V_{ch}$ is reduced.

Figure 4:
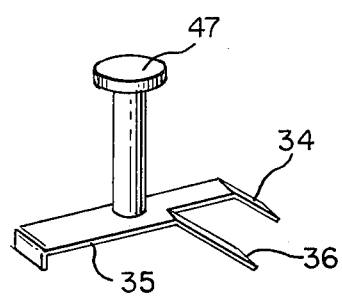
FIG. 4 is a view in perspective of a switch utilized in the device.

The comparator 38 compares the voltage $V_{ref}$ with the voltage at the electrode 24 and outpus a significant voltage change whenever the electrode potential drops below that of the reference voltage $V_{ref}$. Comparator 38 is also connected to an inverter 40 or an equivalent device. The voltage change described above causes inverter 40 to turn on a warning device such as a horn 44 or a light 42, or both which are electrically connected to the inverter 40. The operation of light 42 and horn 44 may be tested by pushbutton 47 (FIG. 4). The value of voltage $V_{ref}$ is preselected to be equivalent to the potential of the battery 33 minus the voltage drop across the resistor 32 caused by the current in chamber C produced by a given amount of radiation from a source R. Battery 33 is disposed in well 50 and is connected to the alarm circuit and to resistor 32 and switch 36.

In the configuration shown in FIG. 4, the test and reset switches 34, 36 comprise a single unit made by cutting a copper strip 35 to form two wings 34 and 36. This switch operates in the following manner:

When the switch button 47 is pushed in completely, both switches 36 and 34 are closed, whereby electrode 24 will be at a potential determined by the battery 33 and the ratio of resistor $R_1$ and $R_2$. This potential is chosen to be below the value of $V_{ref}$, such that the invertor 40 is on, thereby causing the alarm to sound (indicating proper circuit operation).

When switch button 47 is released, switch 34 opens before switch 36 causing the potential of electrode 24 to return to the potential of battery 33 thereby resetting the device. If the radiation level is higher than the minimum level, this higher level can be evaluated through a knowledge of the time required for the chamber voltage to reach the reference voltage. This time is dependent on both the $V_{ref}$ level and the chamber time constant. The chamber time constant is determined by the resistance of resistor 32 and the equivalent chamber capacitance 30. This chamber capacitance is determined by container C and electrode 24. To increase the time constant, an additional discrete capacitor 54 may be added across the chamber capacitance 30. By momentarily closing reset swtich 36, capacitor 30 becomes charged to the voltage of battery 33. The time required to discharge the capacitor 30 to $V_{ref}$ is indicative of the level of radiation R.

In a further embodiment the chamber and its associated capacitance, the high resistance resistor and switches 34, 36 may be interchanged with the polarity of the comparator reversed.

Figure 3:
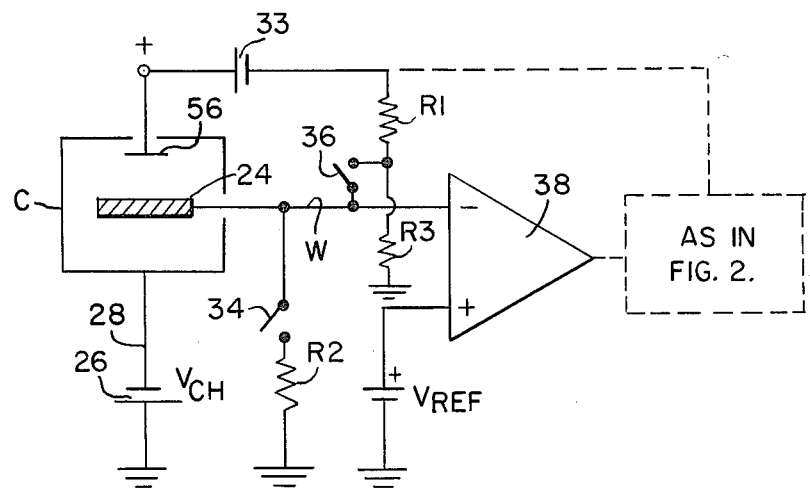
FIG. 3 is a fragmentary view of a modification which may be used with the circuit of FIG. 2.

In a further embodiment shown in FIG. 3, the high resistance resistor 32 is replaced with an electrode 56 inside chamber C. In this embodiment, the ratio of the currents between electrodes 56 and 24 and the chamber current $I_{CH}$ determine the sensitivity of the detector. Switch 36 is modified so that when it is closed electrode potential 24 becomes equal to the ratio of resistors $R_1$ and $R_3$, an additional resistor connected to switch 36.

FIG. 4 is a view of the switch actuated by button 47. As shown, the switch comprises an actuating button 47 at one end of a rod or strip 35 which terminates in two flexible copper strips 34, 36, each of which completes its own circuit independently when button 47 is depressed.

The maximum radiation level R measurable by this device is limited only by the voltage (potential) between the chamber C and electrode 24. For high levels of radiation R it may be necessary to increase the chamber voltage $V_{ch}$ in a negative direction by means of a suitable source of potential.

The function of the switch and the time measurement may be automated into the integrated circuit as to visually or aurally display these results.

We claim:

1. An integrated nuclear radiation detector and monitor comprising in combination:

means constituting an ionization chamber (C) including walls defining said chamber;

an electrode (24) positioned inside said chamber and electrically insulated from said chamber;

means for maintaining a potential ($V_{CH}$) between said electrode and said chamber so that the current flowing from said electrode is equal to the saturation current of said ionization chamber for any given level of radiation;

an electrical circuit including a source of potential (33);

means interposed in the electrical circuit between said source of potential (33) and said electrode (24) providing a high resistance between said source of potential (33) and said electrode (24);

means producing an adjustable reference potential ($V_{ref}$);

a comparator (38) one terminal of which is connected to said reference potential ($V_{ref}$) and another terminal of which is connected to said electrode (24) for comparing the reference voltage with the voltage at said electrode, thereby producing an output signal;

a solid state invertor (40) electrically connected to the output side of said comparator to receive said output signal; and an alarm electrically connected to said solid state invertor and actuated by said output signal.

2. The detector of claim 1 in which the means interposed in the electrical circuit between said source of potential and said electrode is a very high resistance electrically connected to said electrode (24).

3. The detector of claim 1 in which the means interposed in the electrical circuit between said source of potential and said electrode is a second electrode located within said ionization chamber (C).

4. The detector of claim 1 including in addition:

a switch with two contacts (34, 36) connected to said source of potential (33), one of said contacts (36) completing a reset operation and the other of said contacts completing a test operation for said radiation detector.

5. The detector of claim 1 including in addition a capacitor (54) connected to said electrode (24) to increase the time constant of said ionization chamber (C).

6. The detector of claim 1 including a housing (H) in which said detector is enclosed and which projects it from the intrusion of moisture and other foreign materials.

7. The detector of claim 1 in which said electrical circuit, said high resistance means, said comparator and said solid state invertor are contained in a printed circuit board (M).

* * * * *